UNITED STATES PATENT OFFICE.

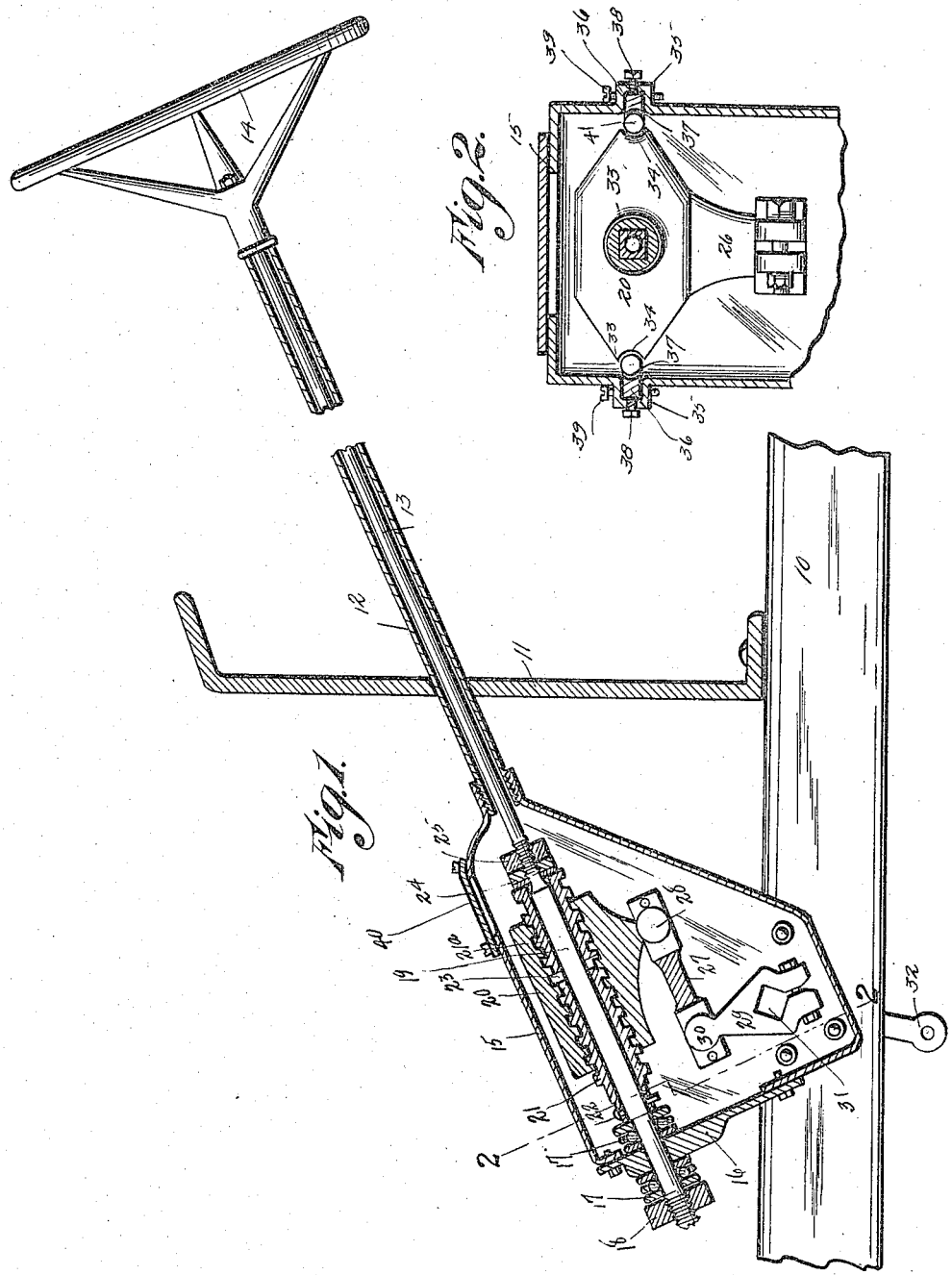

CARL E. BISHOP AND IRA J. BISHOP, OF MITCHELLVILLE, IOWA.

ADJUSTABLE SCREW GEARING.

1,167,330.

Specification of Letters Patent.

Patented Jan. 4, 1916.

Application filed October 6, 1913. Serial No. 793,959.

*To all whom it may concern:*

Be it known that we, CARL E. BISHOP and IRA J. BISHOP, citizens of the United States, and residents of Mitchellville, in the county of Polk and State of Iowa, have invented a certain new and useful Adjustable Screw Gearing, of which the following is a specification.

The object of our invention is to provide an adjustable screw gearing of simple and inexpensive construction.

More particularly, it is our purpose to provide an adjustable screw gearing of the type using a worm gear, in which the worm is divided into two parts somewhat spaced apart from each other, one of the parts being capable of adjustment upon the steering rod for taking up all play in the worm gear.

Our invention consists in certain details, in the construction, combination and arrangement of the various parts of our device, whereby the objects contemplated are attained, as hereinafter more fully set forth, pointed out in our claims and illustrated in the accompanying drawings, in which:

Figure 1 shows a longitudinal, sectional, detail view of an adjustable screw gearing embodying our invention. Fig. 2 shows a transverse, sectional view, taken on the line 2—2 of Fig. 1.

In the accompanying drawings we have used the reference numeral 10 to indicate generally the frame of an automobile on which is mounted the dash 11, through which extends the sleeve 12 which receives the steering rod 13. In the upper end of the steering rod 13 is the wheel 14 which may be of ordinary construction. The lower end of the sleeve 12 screws into the casing 15. The steering rod 13 extends through the casing 15 and is rotatably mounted in the movable cover 16 at the lower end of said casing. On each side of the casing 16 are ball bearings 17. The lower end of the rod 13 is screw threaded and receives a nut 18. A portion of the rod 13 within the casing 15, indicated by the reference numeral 19, is made angular in cross section.

Suitably mounted within the casing 15, in the manner hereinafter described, is a nut 20, having an internally screw threaded opening extending through it. Mounted on the angular portion 19 of the rod 13 is a worm which is preferably divided along its transverse median line into two parts 21 and 21ª. The lower part 21 of the worm is fixed on the portion 19 of the shaft 13 by means of a bolt 22 and is screwed into the nut 20. The upper portion 21ª of the worm is slidably mounted on the angular portion of the shaft 13 and is screwed into the upper end of the nut 20.

In originally assembling the parts, the two portions of the worm are so mounted that a slight space 23 is left between them. The rod 13 above the angular portion 19 thereof is screw threaded to receive a nut 24 and the lock nut 25. When the device is ready for use, the nut 24 is screwed snugly against the upper portion 21 of the worm and the nut 25 is screwed against the nut 24. The nut 20 is provided with a downward extension 26 which is connected with a link 27 by means of the ball and socket joint 28. The link 27 is connected with a short lever 29 by means of a similar ball and socket joint 30. The lever 29 is mounted on the shaft 31 which extends through the wall of the casing and is fixed to the arm 32.

To prevent lateral or rotary motion of the nut 20 when the steering rod is rotated, the said nut 20 is formed with lateral extensions 33 in the side edges of which are formed ball races 34. The opposite sides of the casing 15 are provided with outwardly extending grooves or slots 35 in which are slidably mounted bars 36, on the inner edges of which are formed ball races 37. In the side walls of the grooves 35 are a plurality of screw bolts 38 for forcing the bars 36 inwardly for taking up the play in the ball races and in the top walls of said grooves or slots are a plurality of screw bolts 39 for locking said bars 36 in any of their adjusted positions. Between the respective races 34 and 37 are pluralities of balls 41.

The advantages of our improved adjustable screw gearing may be largely seen from the foregoing description. It will readily be seen that should the threads of the worm gear or of the nut 20 become worn the play which would otherwise be permitted can be readily taken up by screwing the nuts 24 and 25 downwardly and thereby moving the part 21ª toward the part 21. At some suitable point on the casing 15 is a removable cover plate 40 for permitting easy access to the nuts 24 and 25. The means whereby lateral and rotary play of the nut 20 is avoided are of extremely simple construction and are adjustable so that any play in the ball bearings may be readily and easily taken up.

A great many changes may be made in the details of the construction of our adjustable screw gearing without departing from its essential features and it is our intention to cover by this application any such changes which may be included within the scope of the appended claims.

We claim as our invention:

1. In a device of the class described, a casing, a steering rod extended through the casing and rotatably mounted therein, a two piece worm gear mounted on said rod, one part being fixed on the rod and the other part being spaced from the first part and slidably but non-rotatably mounted on the rod, a nut on said worm gear, adjustable means on said rod for moving the second part of the worm gear toward the fixed part thereof, and suitable guides for supporting said nut on said casing.

2. In a device of the class described, a casing, a steering rod extended through the casing and rotatably mounted therein, a two piece worm gear mounted on said rod, one part being fixed on the rod and the other part being spaced from the first part and slidably but non-rotatably mounted on the rod, and adjustable means on said rod for moving the second part of the worm gear toward the fixed part thereof, a nut on said worm gear, and adjustable guide devices on opposite sides of said nut for slidably mounting said nut on said casing.

3. In a device of the class described, a casing, a steering rod extended through the casing and rotatably mounted therein, a two piece worm gear mounted on said rod, one part being fixed on the rod and the other part being spaced from the first part and slidably but non-rotatably mounted on the rod, a nut on said worm gear, adjustable means on said rod for moving the second part of the worm gear toward the fixed part thereof, said nut and said casing being provided with coacting guide members for supporting the nut against rotation while permitting it to slide parallel with the rod, part of said guide members being adjustable toward and from the rod.

Des Moines, Iowa, September 12, 1913.

CARL E. BISHOP.
IRA J. BISHOP.

Witnesses:
S. ROBINSON,
L. J. BARNEY.

Copies of this patent may be obtained for five cents each, by addressing the "Commissioner of Patents, Washington, D. C."